(12) United States Patent
Chan

(10) Patent No.: US 7,088,221 B2
(45) Date of Patent: Aug. 8, 2006

(54) WEATHER STATION

(75) Inventor: Raymond Chan, Hong Kong (HK)

(73) Assignee: IDT Technology Limited, Kowloon (HK)

( * ) Notice: Subject to any disclaimer, the term of this patent is extended or adjusted under 35 U.S.C. 154(b) by 174 days.

(21) Appl. No.: 10/778,163

(22) Filed: Feb. 17, 2004

(65) Prior Publication Data

US 2005/0156745 A1    Jul. 21, 2005

(30) Foreign Application Priority Data

Jan. 16, 2004    (EP)    ................................. 04250198

(51) Int. Cl.
    *G08B 17/00*    (2006.01)

(52) U.S. Cl. ........................... 340/286.05; 340/539.26; 340/539.27; 340/539.28; 340/601; 340/691.6

(58) Field of Classification Search ........... 340/286.05, 340/539.26, 539.27, 539.28, 601, 691.6, 340/539.1, 539.11, 539.22, 602, 7.51, 7.55, 340/7.56
    See application file for complete search history.

(56) References Cited

U.S. PATENT DOCUMENTS

| | | | | |
|---|---|---|---|---|
| 6,031,579 | A | * | 2/2000 | Stephenson .................. 348/564 |
| 6,300,871 | B1 | * | 10/2001 | Irwin et al. ............. 340/539.28 |
| 6,449,219 | B1 | | 9/2002 | Hepp et al. |
| RE38,584 | E | * | 9/2004 | Robinson ..................... 340/601 |
| 6,804,526 | B1 | * | 10/2004 | Yarkosky ..................... 455/466 |
| 2002/0141400 | A1 | | 10/2002 | DeMartino |
| 2003/0076745 | A1 | | 4/2003 | Chapman |

FOREIGN PATENT DOCUMENTS

CA    2 299 038 A1    8/2001

OTHER PUBLICATIONS

"A colourful window on the world—Weather forecasting at a glance" [online] Dec. 23, 2003, XP002285125, Retrieved from the Internet: URL:http://www.oregonscientific.co.uk/press_detail.asp?p=23> [retrieved on Jun. 18, 2004].
"AWS868 Mateo Vision The Worlds 1st Full Colour Weather Station" [online] XP002285156 Retrieved from the Internet: URL:http://www.oregonscientific.co.uk.product.asp?c=2&s=9&p=207> [retrieved on Jun. 18, 2004].
Banerjee A et al.: "Generalized multiprotocol label switching: an overview of routing and management enhancements" IEEE Communications Magazine, Jan. 2001, IEEE, USA, vol. 39, No. 1, pp. 144-150.
Epstein H. et al.; "Managing optical networks" Bell Labs Technical Journal, Jan.-Jun. 2001, Lucent Technologies, USA, vol. 6, No. 1, pp. 50-66.

* cited by examiner

*Primary Examiner*—Daryl C Pope
(74) *Attorney, Agent, or Firm*—Leydig, Voit & Mayer, Ltd.

(57) ABSTRACT

A weather station (100) for indicating weather conditions, comprises a casing (110) having a screen (120) and an internal electronic operating circuit (90). The operating circuit (90) includes at least one sensor (70) for sensing an atmospheric parameter and a microprocessor (80) for ascertaining a weather condition based on the sensed atmospheric parameter and indicating the weather condition on the screen (120). The operating circuit (90) includes a memory (60) which stores several sets of images, each set representing a corresponding variation of the weather condition, for selection by the microprocessor (80) to indicate the weather condition in the variation as ascertained in an animated representation.

13 Claims, 8 Drawing Sheets

FIG. 6A
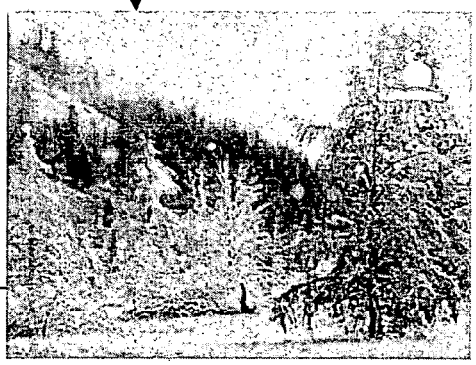 
FIG. 6B          FIG. 6E
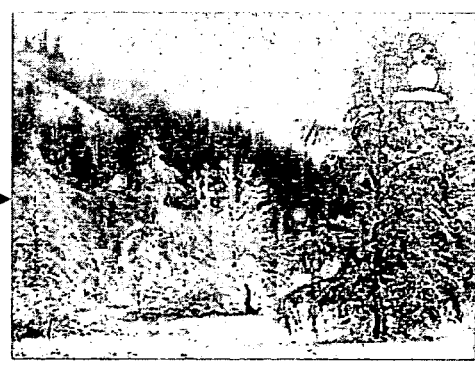 
FIG. 6C          FIG. 6D

WEATHER STATION

The present invention relates to a weather station for indicating weather conditions.

BACKGROUND OF THE INVENTION

Weather stations (or monitors) are generally known, which may incorporate other functions or be included as part or a function of an equipment of another type and in particularly a clock. Conventionally, weather conditions and especially weather forecast conditions are often indicated by means of symbols on an LCD screen, such as sun, cloud and snowflake symbols, the whole of which or some of their parts (segments) are turned on and off as appropriate. Such symbols are however usually insufficiently prominent and unattractive.

The invention seeks to provide a weather station that is capable of indicating weather conditions in a more prominent or attractive manner.

SUMMARY OF THE INVENTION

According to the invention, there is provided a weather station for measuring and indicating weather conditions, comprising a casing having a screen and an electronic operating circuit in the casing. The operating circuit includes at least one sensor for sensing an atmospheric parameter and a microprocessor for ascertaining a weather condition based on the sensed atmospheric parameter and indicating the weather condition on the screen. The operating circuit includes a memory which stores a plurality of sets of images, each set representing a corresponding variation of the weather condition, for selection by the microprocessor to indicate the weather condition in the variation as ascertained in an animated representation.

Preferably, the microprocessor is programmed to display the images of each selected set on the screen as a repeating slide show for animation.

It is preferred that the microprocessor is programmed to display the images of each selected set on the screen sequentially in a predetermined order for animation.

It is further preferred that the images of each set are slightly but discernibly different from one another as between adjacent images.

Preferably, the images of each set have substantially the same size as the screen for full screen display thereon.

Alternately, the images of each set have considerably smaller size than the screen for display at a part thereof.

In a preferred embodiment, the images of each set comprise photographic images.

More preferably, the photographic images of each set depict a scenery in the weather condition in the variation as ascertained.

In a preferred embodiment, the images of each set comprise graphic images.

More preferably, the graphic images of each set depict an object relevant to the weather condition in the variation as ascertained.

It is preferred that the atmospheric parameter based on which the weather condition is to be ascertained comprises atmospheric pressure.

It is preferred that the variations of the weather condition comprises sunny, cloudy, rainy and snow conditions.

Advantageously, the operating circuit includes a memory storing a sound associated with each set of images and an audio generator for emitting a corresponding sound while the images of each selected set are being displayed on the screen.

BRIEF DESCRIPTION OF DRAWINGS

The invention will now be more particularly described, by way of example only, with reference to the accompanying drawings, in which:

FIGS. 6A to 6E illustrate an animated representation of a "Snow" condition on the screen of FIG. 1.

DETAILED DESCRIPTION OF PREFERRED EMBODIMENT

Figure 1:
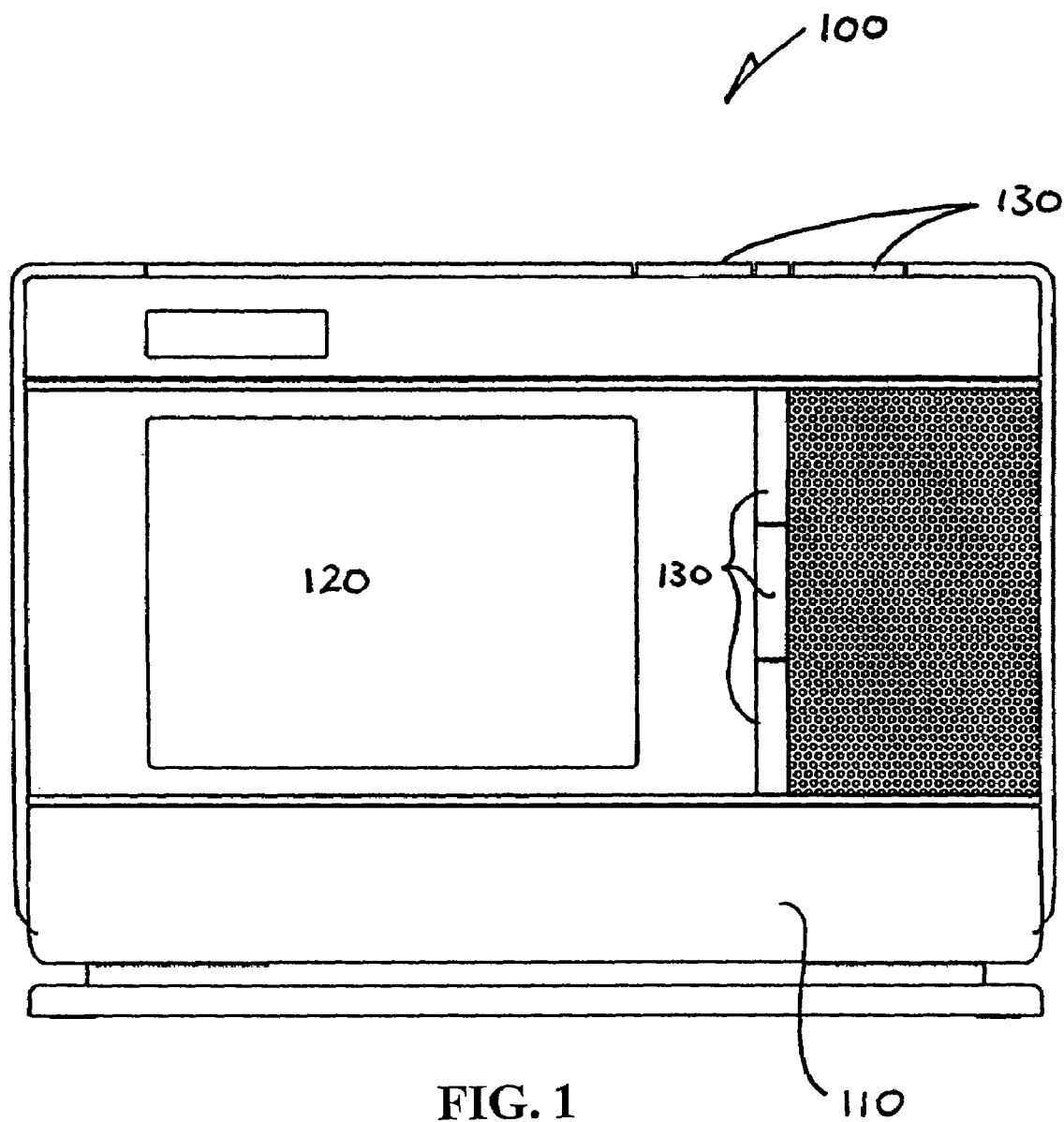
FIG. 1 is a front elevational view of an embodiment of a weather station in accordance with the invention, the station including a screen.
Figure 1A:
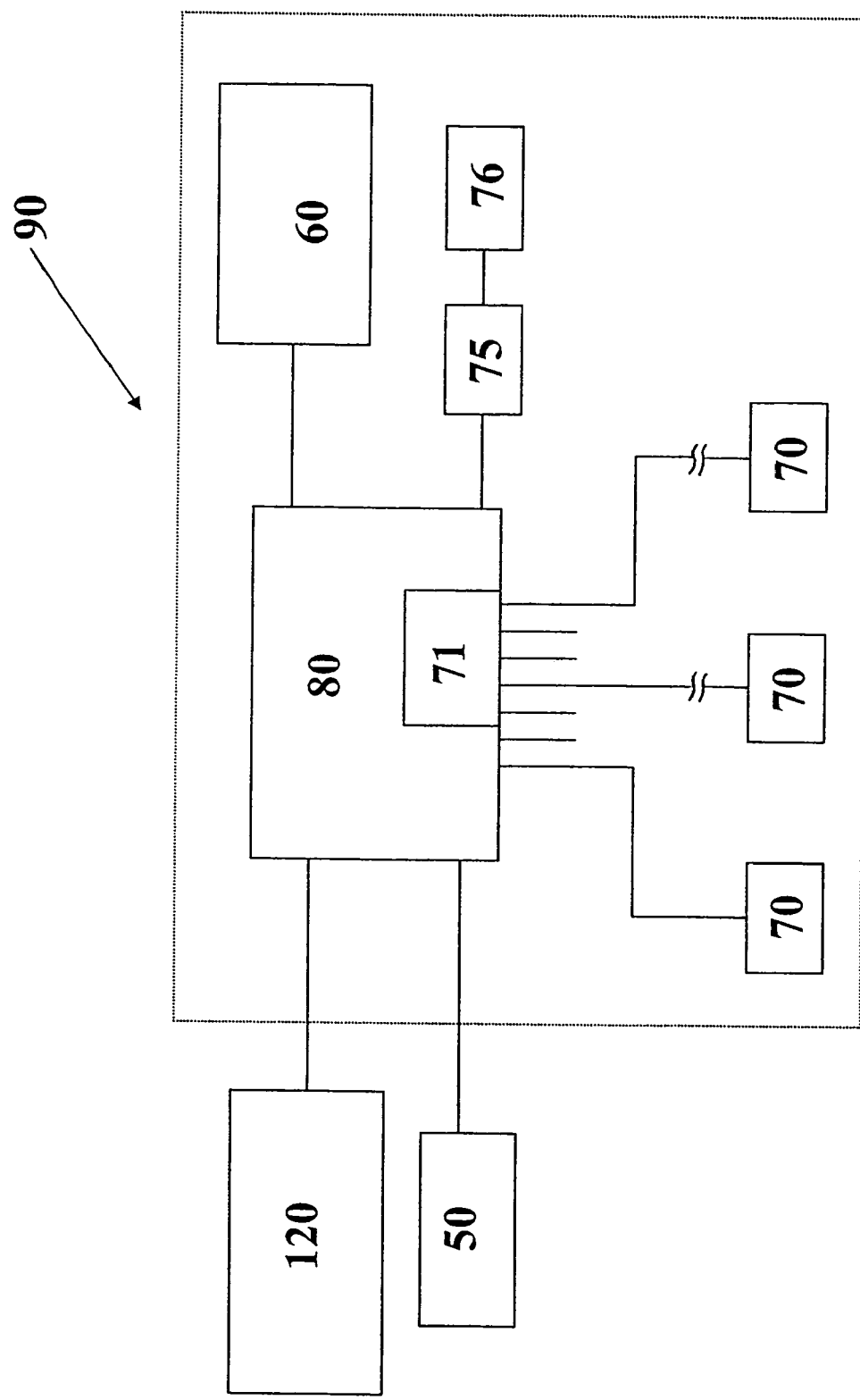
FIG. 1A is a schematic functional block diagram of an operating circuit of the weather station of FIG. 1.

Referring to the drawings, there is shown a weather station 100 embodying the invention, which comprises a rectangular casing 110 having a white LED backlighted colour LCD screen 120, several buttons or keys 130, and an internal electronic operating circuit 90 for measuring various atmospheric parameters to indicate weather conditions as well as providing time and calendar information on the screen 120. The atmospheric parameters are barometric pressure, temperature and humidity and weather forecast is also included, all of which are collectively referred to as weather conditions.

The operating circuit 90 is built based on a microprocessor 80 to perform various weather and clock functions. For weather functions, the microprocessor 80 is programmed and calibrated to process various weather input signals and perform relevant computations and then provide appropriate outputs for display on the screen 120 in various modes. For clock functions, a built-in radio-controlled clock module 75 of the operating circuit 90 provides time and calendar information as well as an alarm. There is included a radio-frequency (RF) clock sensor 76 for automatic synchronization with the RF time and calendar signals broadcast by the local authority of the country or time zone concerned for official time synchronization. The time display on the screen 120 may be selected in a digital, analogue or cuckoo mode.

The operating circuit 90 includes a plurality of sensors 70 for sensing the various weather parameters, such as pressure, temperature and humidity in particular. Some of the sensors 70 are wired within the station casing 110 for indoor measurements especially for temperature and humidity, whilst the others are remote thermo-hygro sensors 70 placed at selected outdoor locations for measuring all necessary parameters. A receiver module 71 of the operating circuit 90 provides a number of wireless (e.g. FM) communication channels for receiving input signals from up to five such remote sensors 70, whose transmitter modules are tuned to the corresponding channels.

Indoor temperature can be measured in the range from 0° C. to 50.0° C. (32° F. to 122.0° F.) and outdoor (remote) temperature from −20.0° C. to +60.0° C. (−4.0° F. to +140.0° F.), at a resolution of 0.1° C. (0.2° F.). Both indoor and outdoor humidity can be measured in the range from 25% to 95%, at a resolution of 1%.

Barometric pressure is to be measured and displayed in mb/hPa or inHg numerically as selected by a user or may be displayed in the form of a bar-chart especially for pressure history over the last 24 hours for example. Altitude adjustment is built-in for automatic atmospheric pressure compensation from −100 m to 2500 m.

It is known that the trend of change in atmospheric pressure provides a reasonably reliable basis for ascertaining the prevailing weather condition and/or predicting the forthcoming weather condition. Intensive research and analysis including statistical studies on this topic have been conducted, and various algorithms derived for use in weather forecast. For this function, the subject microprocessor 80 is programmed based on an appropriate algorithm to ascertain and indicate on the screen 120 five different variations of weather forecast conditions, which are particularly but not exclusively "Sunny", "Partly Cloudy", "Cloudy", "Rainy" and "Snow".

The first four conditions are determined primarily according to the variations in atmospheric pressure which is measured by the relevant sensor 70 every fifteen minutes over a certain past period of time, at least several hours. Such pressure variations include, for example, the rate of rise or fall and the relative level as between the highest and lowest measurements.

Identifying the "Snow" condition also requires the use of rain and thermal sensors 70.

These weather forecast conditions are to be displayed under the control of the microprocessor 80 by way of relevant animated representations, including related icons and sound effects, for prominence and attractiveness. Each animated representation is composed by a set of five images to represent a prevailing or forecast variation in the weather condition. The images are primarily photographic images or pictures which are stored in a memory 60 of the operating circuit 90 (e.g. ROM or microprocessor registers) for selection by the microprocessor 80 for display on the screen 120 one after another or sequentially in a predetermined order and in repeated cycles.

The picture images have generally the same size as the screen 120 for full-screen display essentially as a repeating slide show played back over a certain period of time. Adjacent images from the first to the last one are slightly but discernibly different such that there is a gradual change to animate a motion and/or movement, in that whilst the various elements remain generally in the same positions they shift or expand/contract, or in general change, to a small extent from one image or frame to the next.

Figure 2A:
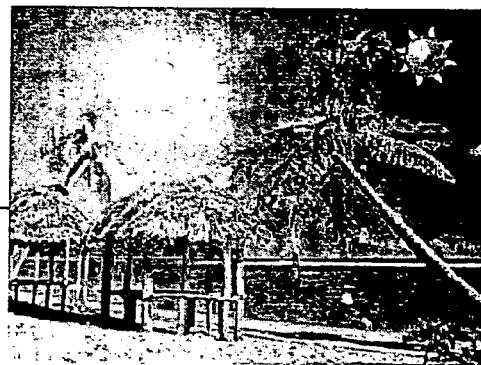
FIGS. 2A to 2E illustrate an animated representation of a "Sunny" condition on the screen of FIG. 1.
Figure 2B:
Figure 2E:
Figure 2C:
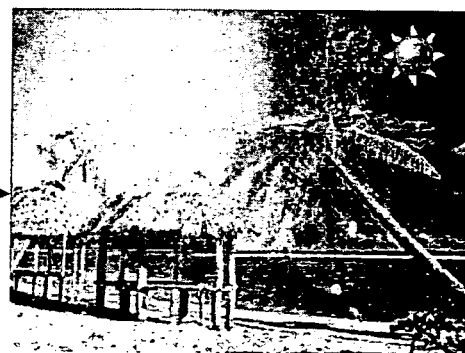
Figure 2D:

In FIGS. 2A to 2E, the "Sunny" condition is represented by a beach scenery that includes a burning sun generally in the middle and a graphic sun icon at the top right corner. The sun icon gradually changes by its rays extending and retracting for animation. A (piezo-electric) speaker 50 of the station 100 simultaneously emits the sound of lapping waves and a seagull.

Figure 3A:
FIGS. 3A to 3E illustrate an animated representation of a "Partly Cloudy" condition on the screen of FIG. 1.
Figure 3B:
Figure 3E:
Figure 3C:
Figure 3D:

In FIGS. 3A to 3E, the "Partly Cloudy" condition is represented by another beach scenery that includes some clouds occupying about half of the sky and an animated sun-behind-cloud icon at the top right corner. In the icon, the sun rays extend and retract and the cloud drifts sideways gradually. There is emitted the tune of a singing bird.

Figure 4A:
FIGS. 4A to 4E illustrate an animated representation of a "Cloudy" condition on the screen of FIG. 1.
Figure 4B:
Figure 4E:
Figure 4C:
Figure 4D:

In FIGS. 4A to 4E, the "Cloudy" condition is represented by a wheat field scenery that includes thick clouds covering most of the sky and a symbolic cloud icon at the top right corner. The icon consists of a small cloud moving from left to right underneath a large cloud, accompanied by the sound of breeze.

Figure 5A:
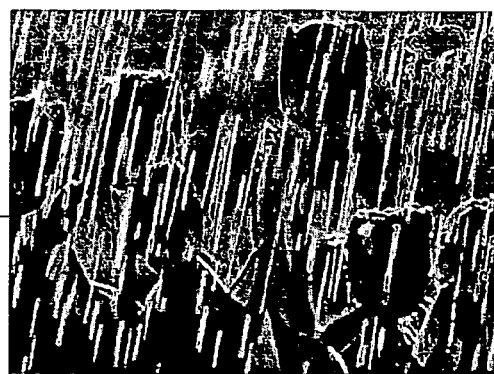
FIGS. 5A to 5E illustrate an animated representation of a "Rainy" condition on the screen of FIG. 1.
Figure 5B:
Figure 5E:
Figure 5C:
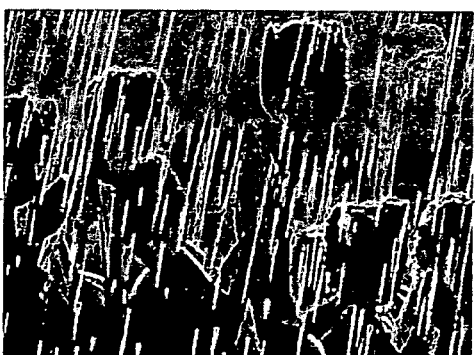
Figure 5D:
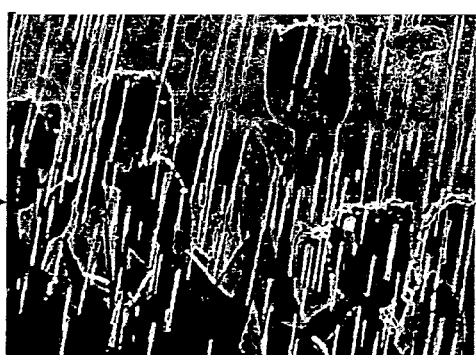
Figure 7:
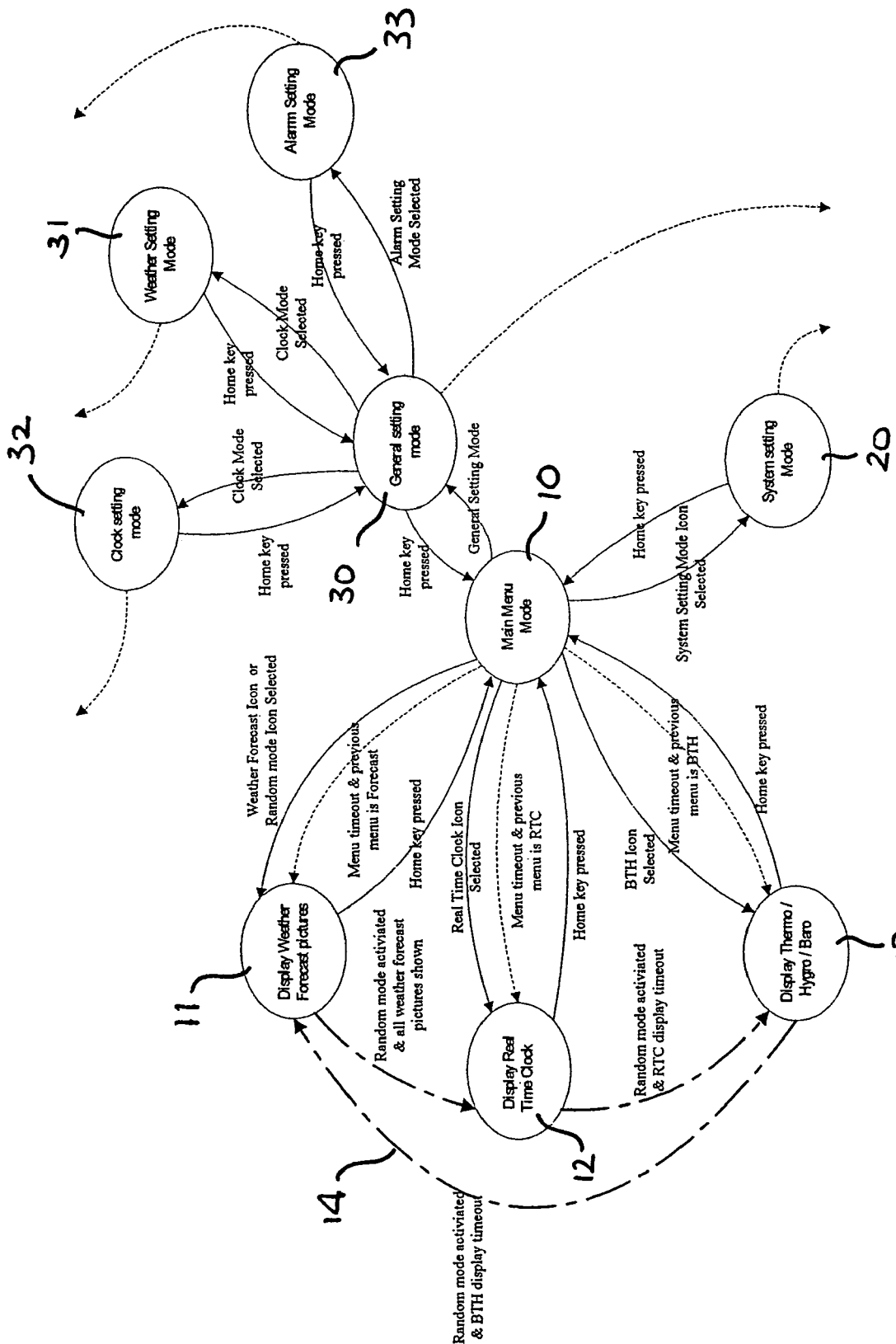
FIG. 7 is a schematic functional block diagram illustrating various functions of the weather station of FIG. 1.

In FIGS. 5A to 5E, the "Rainy" condition is represented by a photograph of carnations in the rain, in that the rain drops appear as streaks animated to shoot downwards. There is a cloud icon with falling rain drops underneath it at the top right corner, with a raining sound in the background.

In FIGS. 6A to 6E, the "Snow" condition is represented by a winter view of the foot of a mountain with trees and animated falling snowflakes. There is a snowman icon having a smiling face and moving arms at the top right corner, together with a howling wind sound.

In each of these animated representations, there is the considerably smaller graphic icon (sign, logo or symbol) superimposed on the main photographic illustration. The icon depicts an object relevant to or sharing the same theme as the weather condition variation, and is useful for easier or immediate recognition. Given that the icon does represent the relevant weather condition and include animation, it can be used alone as the only animated representation for weather forecast.

The weather station 100 has a number of operating modes that can be entered or exited or in general selected using the keys 130, which include relevant mode select keys and a home key. These modes include a main menu mode 10, a system setting mode 20 switchable to and from the main menu mode 10, and a general setting mode 30 that is also switchable to and from the main menu mode 10. The general setting mode 30 is switchable to and from three specific setting modes, namely weather setting mode 31, clock setting mode 32 and alarm setting mode 33.

The main menu mode 10 provides selection to three other modes to display weather forecast pictures (animated representations) 11, display real time clock (RTC) 12 or display thermo/hygro/baro (BTH) readings 13. The menu mode 10 also permits activation of a random mode 14, in which the three display modes 11 to 13 are cycled through.

The weather forecast pictures are displayed in a separate mode (i.e. mode 11). It is envisaged that these pictures may be used as an animated wallpaper on which real time 12 or atmospheric readings 13 are displayed in an unobtrusive form, so that the animated weather forecast representation will always stay on. The aforesaid animation icons (appearing at the corner of the screen 120) are particularly suitable for this purpose, not as a wallpaper but a foreground feature, as they are small in size.

The invention has been given by way of example only, and various other modifications of and/or alterations to the described embodiment may be made by persons skilled in the art without departing from the scope of the invention as specified in the appended claims.

What is claimed is:

1. A weather station for measuring and indicating weather conditions, comprising:
   a casing having a screen; and
   an electronic operating circuit in the casing, which includes at least one sensor for sensing an atmospheric parameter and a microprocessor for ascertaining a weather condition based on the sensed atmospheric parameter and indicating the weather condition on the screen;
   the operating circuit including a memory which stores a plurality of sets of images, each set representing a corresponding variation of the weather condition, for selection by the microprocessor to indicate the weather condition in the variation as ascertained in an animated representation.

2. The weather station as claimed in claim 1, wherein the microprocessor is programmed to display the images of each selected set on the screen as a repeating slide show for animation.

3. The weather station as claimed in claim 1, wherein the microprocessor is programmed to display the images of each selected set on the screen sequentially in a predetermined order for animation.

4. The weather station as claimed in claim 3, wherein the images of each set are slightly but discernibly different from one another as between adjacent images.

5. The weather station as claimed in claim 1, wherein the images of each set have substantially the same size as the screen for full screen display thereon.

6. The weather station as claimed in claim 1, wherein the images of each set have considerably smaller size than the screen for display at a part thereof.

7. The weather station as claimed in claim 1, wherein the images of each set comprise photographic images.

8. The weather station as claimed in claim 7, wherein the photographic images of each set depict a scenery in the weather condition in the variation as ascertained.

9. The weather station as claimed in claim 1, wherein the images of each set comprise graphic images.

10. The weather station as claimed in claim 9, wherein the graphic images of each set depict an object relevant to the weather condition in the variation as ascertained.

11. The weather station as claimed in claim 1, wherein the atmospheric parameter based on which the weather condition is to be ascertained comprises atmospheric pressure.

12. The weather station as claimed in claim 1, wherein the variations of the weather condition comprises sunny, cloudy, rainy and snow conditions.

13. The weather station as claimed in claim 1, wherein the operating circuit includes a memory storing a sound associated with each set of images and an audio generator for emitting a corresponding sound while the images of each selected set are being displayed on the screen.

* * * * *